United States Patent [19]
Hedvig et al.

[11] 3,756,074
[45] Sept. 4, 1973

[54] CONTINUOUSLY RECORDING MECHANICAL RELAXATION SPECTROMETER

[75] Inventors: Peter Hedvig; László Miskolczy, both of Budapest, Hungary

[73] Assignee: Muanyagipari Kutato Intezet, Budapest, Hungary

[22] Filed: Apr. 5, 1971

[21] Appl. No.: 128,620

[30] Foreign Application Priority Data
Apr. 6, 1970 Hungary.................................. 440

[52] U.S. Cl.................................... 73/99, 73/15.6
[51] Int. Cl............................................. G01n 3/32
[58] Field of Search....................... 73/15.6, 99, 101; 318/172

[56] References Cited
OTHER PUBLICATIONS

"Mechanical Investigations of Elastomers in a Wide Range of Frequencies" – Philippoff – Journ. of Applied Physics, Vol. 24, No. 6, June, 1953

*Primary Examiner*—Jerry W. Myracle
*Attorney*—Young & Thompson

[57] ABSTRACT

The continuously recording mechanical relaxation spectrometer includes two bridge connected selsyn type motors operated by two a.c. voltages of different frequencies, one motor being a reference motor connected in reverse phase to the remaining driving motor. A specimen, the moduli of which are to be measured as a function of temperature or frequency, is subjected to torsional oscillation by the driving motor in a controlled temperature environment. Variations in the load on the driving motor are sensed as voltage variations across a load resistor connected to the bridge connected motor system, and these voltage variations are fed to a phase analyser which provides signals to operate one axis of an X-Y recorder. The remaining axis of the recorder is operated by signals from a temperature sensing unit positioned adjacent the specimen.

6 Claims, 7 Drawing Figures

CONTINUOUSLY RECORDING MECHANICAL RELAXATION SPECTROMETER

The present invention relates to a continuously recording mechanical relaxation spectrometer for testing the structure of plastic and rubber systems by continuous measurement of the real and imaginary parts of the complex torsional modulus as a function of the temperature.

Particularly suited for testing the structure of plastic and rubber systems are methods for measuring the effects of dynamic (periodic) stresses as a function of the temperature, or as a function of the frequency. The changes of the bending and torsional moduli as a function of the temperature are related to the molecular structure of the material. Depending on the nature of the material, these moduli exhibit characteristic resonances which are connected with the mobility of the molecules or parts of the molecules.

The methods known hitherto do not permit quick and continuous recording of the mechanical relaxation spectrum. However, this is needed not only for making the testing easier and quicker but also because the structure of viscoelastic materials changes irreversibly during heat treatment. These changes are from a practical viewpoint very important, and they cannot be investigated by the usual measuring equipment.

In one group of the known methods the specimen to be tested is subjected to free torsional oscillations, and the oscillations are recorded optically or by a digital counting device. With such an apparatus, the relaxation spectrum may be obtained by a lengthy calculation only. The recording time of the free oscillations is rather long, thus the time for measuring a spectrum even by using a computer takes at least ten hours.

In another group of the known methods, the substance to be tested is glued to a soft iron plate or a small magnetic plate is fixed on it in order to induce oscillations electro-magnetically. Although this method makes continuous recording possible, the use of a foreign material (magnetic plate) and the uncertainty of the connection between the magnetic plate and the test specimen makes it difficult to use. Therefore below the vitrification temperatures this method is not suitable for investigation of dispersional ranges.

A further group of the hitherto known solutions uses ultrasonic vibrations. With this solution a technical difficulty is encountered from the severe requirements relating to dimensions of the specimen. Furthermore, by the ultrasonic method, measurements can be performed only at high frequencies; while in case of plastics, the flow frequency range is of interest.

Finally, a group of the hitherto known solutions uses forced oscillations excited electromagnetically. The detection, however, is carried out in this case too by an optical method or by a complicated electrodynamic system. In the known electrodynamic devices, the moving (oscillating) system and the detecting coils are separated. This makes the design complicated and utilization difficult. In addition, the hitherto known methods based on forced oscillations can be used only with great mechanical losses.

The aim of the invention is to ensure a solution enabling continuous and quick recording of both components of the complex torsional modulus over a wide temperature range and within a wide range of mechanical losses.

The invention is based on the following recognitions:

1. The mechanical relaxation spectrum may quickly and continuously be recorded as a function of the temperature by using a single phase-reversing selsyn-type motor, to the two pairs of coils of which a.c. voltages of different frequencies are applied and to the shaft of which the specimen to be tested is connected. By a phase analysis of the driving current of the so-established electromechanical system, electric signals proportional to the real part $G'$ and to the imaginary part $G''$ of the complex modulus may be obtained.

2 The current components proportional to $G'$ and $G''$ respectively under (1) may be separated by a two-channel phase-sensitive detector.

3. If for producing the mechanical oscillation, two a.c. voltages with relatively high frequencies are used, as in (1), the separation according to phase of the current required by the electromechanical system becomes possible at a significantly higher frequency than the measuring frequency, rendering detection very simple and sensitive.

4. Compensating for losses originating from the bearings becomes possible by using two identical electromechanical systems in such a way that the currents required by the systems should be 180° out of phase. Thus an essentially higher level of sensitivity can be achieved than by the methods known hitherto based on forced oscillations.

The invention thus relates to a continuously recording mechanical relaxation spectrometer for measuring the temperature dependence of the torsional modulus of plastic and rubber systems, comprising an X-Y recorder and an electronic temperature controller. According to the invention, the spectrometer incorporates a phase-sensitive selsyn-type motor, operated by two a.c. voltages of different frequencies, and an electronic phase analyzer.

The apparatus according to the invention has in a preferred embodiment a gas flow-type temperature programming device for continuous temperature variation.

In a further preferred embodiment of the apparatus according to the invention, two bridge-connected selsyn-type motors are provided.

In still another preferred embodiment of the invention, a two-channel phase analyzer and a two-channel X-Y recorder for recording simultaneously the real and imaginary parts respectively on the complex torsional modulus are provided.

These and other objects, features and advantages of the invention will be readily apparent upon a consideration of the following specification and claims taken in conjunction with the accompanying drawings, in which:

Figure 1:
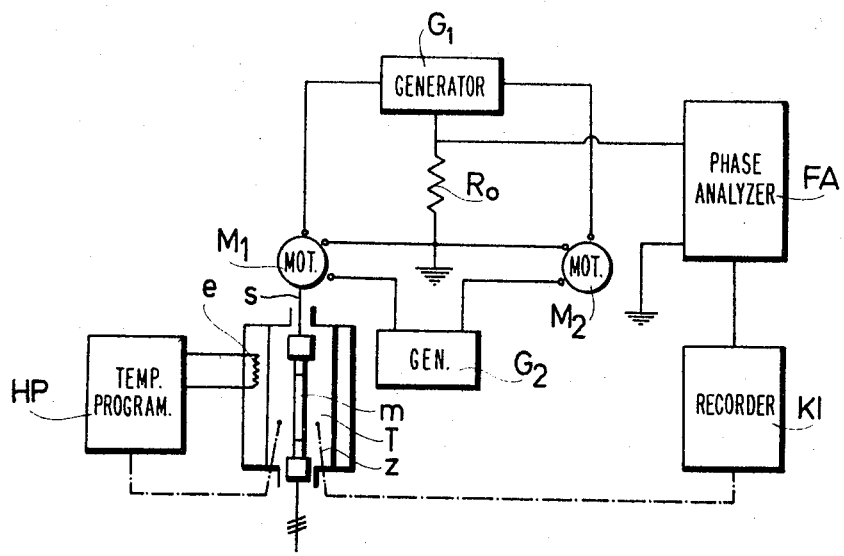
FIG. 1 is a block diagram of the recording mechanical relaxation spectrometer of the present invention.

Referring now to FIG. 1, from generator $G_1$ an a.c. voltage of 50 Hz, and from generator $G_2$ an a.c. voltage of frequency variable between 50 and 100 Hz is applied to the appropriate pair of coils of the selsyn-type motor $M_1$. To the shaft of the motor is connected the specimen $m$, in the form of a rod, a plate or a bundle of fibers, which are placed in the gas thermostat T of known type, which may for example be a copper block in the form of a heat exchanger through which nitrogen gas flows. Electric heater $e$ heats the copper block to heat the nitrogen gas which keeps the test specimen under a nitrogen atmsophere at a temperature that is varied between $-150°$ C. and $+200°$ C. by the temperature-programming device HP at a given rate.

Into the circuit of generator $G_2$ there is connected in reversed phase a reference selsyn-type motor $M_2$. Thus if the mechanical loads on the shafts of both motors are equal, only a very small current will flow through the common load resistance $R_o$. When the mechanical characteristics of the specimen are changed, a voltage drop occurs across resistance $R_o$. This a.c. voltage, the amplitude and phase of which are determined by the torsional moduli of the sample, is separated into two components by the phase analyzer FA. By appropriate phase setting, it can be achieved that the output voltage of the phase analyzer is proportional to the real part $G'$ or to the imaginary part $G''$ of the complex torsional modulus. The real part $G'$ is sometimes referred to in the literature as the storage modulus and the imaginary part as the loss modulus. By using a double-phase analyzer, the temperature dependence of both $G'$ and $G''$ may be recorded simultaneously.

For recording the spectrum, an X-Y recorder (KI) is used, the X-axis of which is operated by the copper-constantan thermocouples $z$, placed near the specimen.

The principal advantages of the apparatus according to the invention are as follows:

1. It is simple, easy to operate, and automatic;
2. It ensures a quick and continuous measurement covering a wide range of temperatures (1 to 1.5 hours, from $-150°$ C. up to $+200°$ C.);
3. Both the real and the imaginary components of the complex torsional modulus may be recorded continuously and simultaneously;
4. It enables measurement of spectra as a function of the temperature, at different, fixed, frequencies; and
5. It can be widely used for testing of plastic and rubber systems.

The principal fields of application of the equipment are as follows:

a. Routine qualification and production surveys of plastic and rubber systems;
b. Testing of mixtures and copolymers with special regard to shockproof tough plastic systems;
c. Testing of structural changes during processing;
d. Testing of ageing processes;
e. Testing of cross-linking processes;
f. Testing the thermomechanical instabilities and irreversibilities; and
f. Testing the structure of complex plastic systems, e.g., glass fiber-reinforced polyester and cord-rubber systems and heavily loaded plastic and rubber systems.

The operation of the equipment according to the invention is shown in the drawings.

Figure 2:
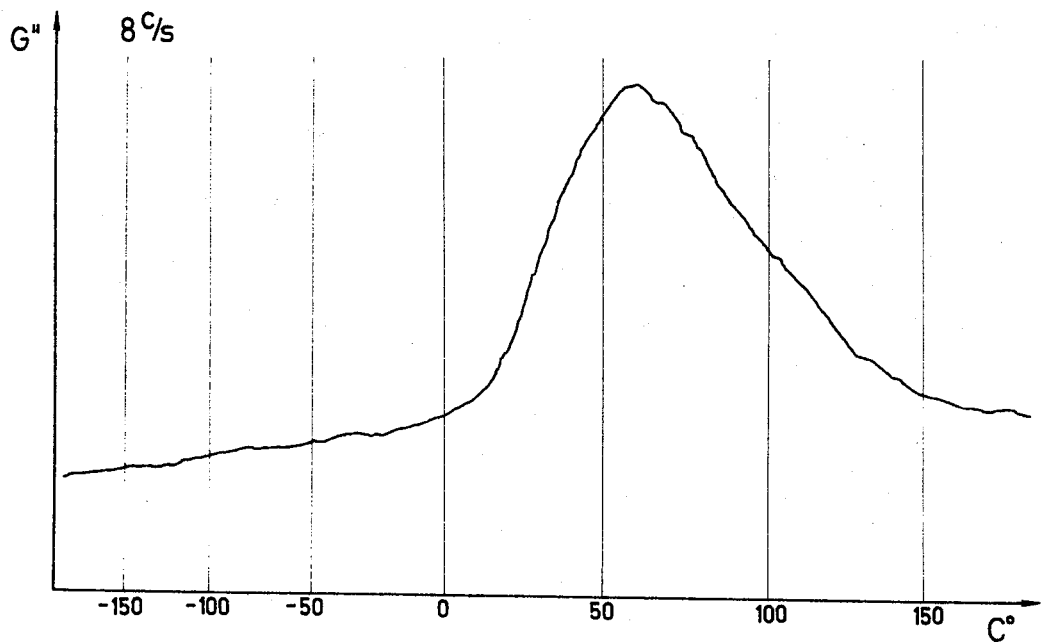
FIG. 2 is a curve disclosing the mechanical relaxation spectrum of polytetrafluoroethylene.

In FIG. 2, the mechanical relaxation spectrum of polytetrafluoroethylene is shown in the temperature range between $-150°$ C. and $+150°$ C. The measurement of a polytetrafluoroethylene plate 1.5 mm. thick was used and the temperature dependence of the imaginary part $G''$ of the complex torsional modulus was recorded at 8 Hz frequency. The frequency of the generator $G_1$ was in this case 50 Hz and that of generator $G_2$ 58 Hz. The obtained relaxation spectrum agrees well with spectra published in the literature recorded by lengthy, point-by-point measurements. The time needed for obtaining the given spectrum was only one hour.

Figure 3:
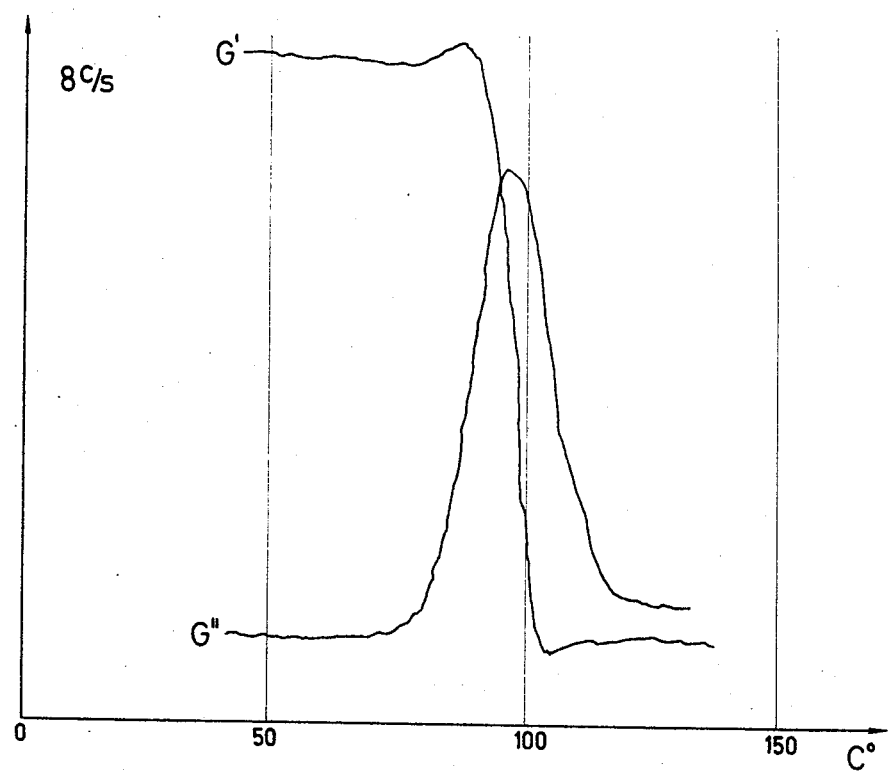
FIG. 3 is a curve disclosing the mechanical dispersion and absorption spectrum of polyvinyl chloride.

In FIG. 3, the mechanical dispersion spectra of 1 mm. thick p.v.c. is shown. The measurement was carried out at 8 Hz and the temperature dependence of both components $G'$ and $G''$ was recorded simultaneously.

Figure 4:
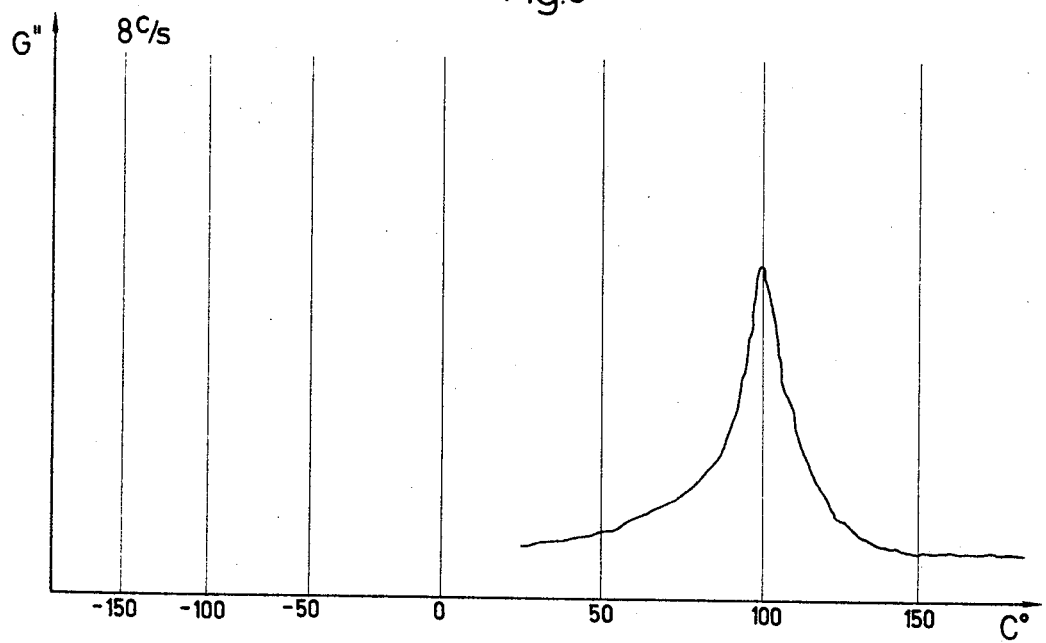
FIG. 4 is a curve showing the mechanical relaxation spectrum of polymethyl-methacrylate.

In FIG. 4, the mechanical relaxation spectrum of polymethyl-methacrylate is shown in the $T_g$ range (between 20° C. and 150° C.). In this case the temperature dependence of $G''$ was measured at 8 Hz.

Figure 5:
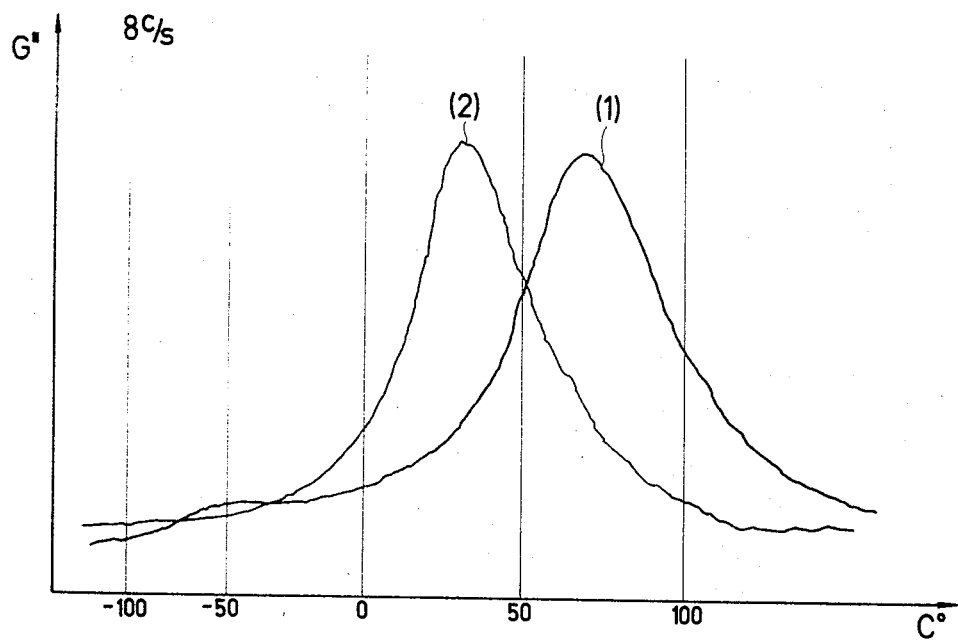
FIG. 5 is a curve showing the mechanical relaxation spectra of two different commercial polyethylene specimens.

In FIG. 5, the mechanical relaxation spectra of two different commercial polyethylene specimens are shown. One of the specimens, that of higher density, was produced by the low pressure process. The other, lower density, Celene 6001-type specimen, was produced by the high pressure process.

Figure 6:
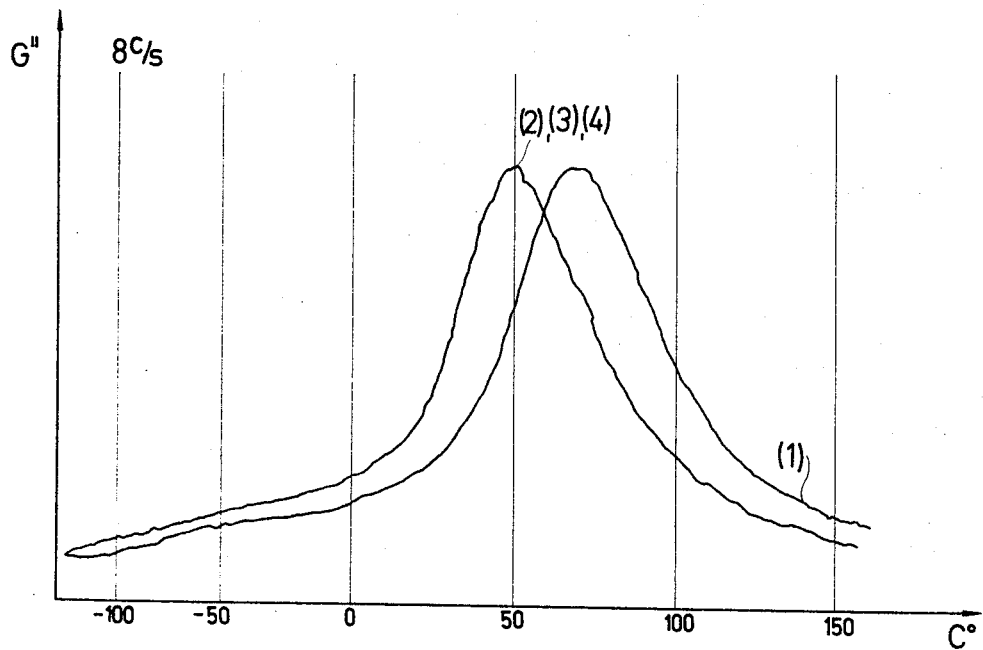
FIG. 6 is a curve showing the mechanical relaxation spectrum of a low pressure-type HD polyethylene.

To illustrate the advantages of the apparatus according to the invention, the change of the mechanical relaxation spectrum of low pressure-type HD polyethylene was measured after rapid cooling down to $-150°$ C. While cooling down, the crystallinity of polyethylene is reduced, causing the relaxational peak to be shifted toward lower temperatures. The spectra are shown in FIG. 6.

Curve (1) relates to a specimen which was not heat treated, and curve (2) to a heat-treated (from 100°C. abruptly cooled down to $-150°$) specimen. It is seen that by this method physical changes in the structure due to heat treatments can be easily investigated.

Figure 7:
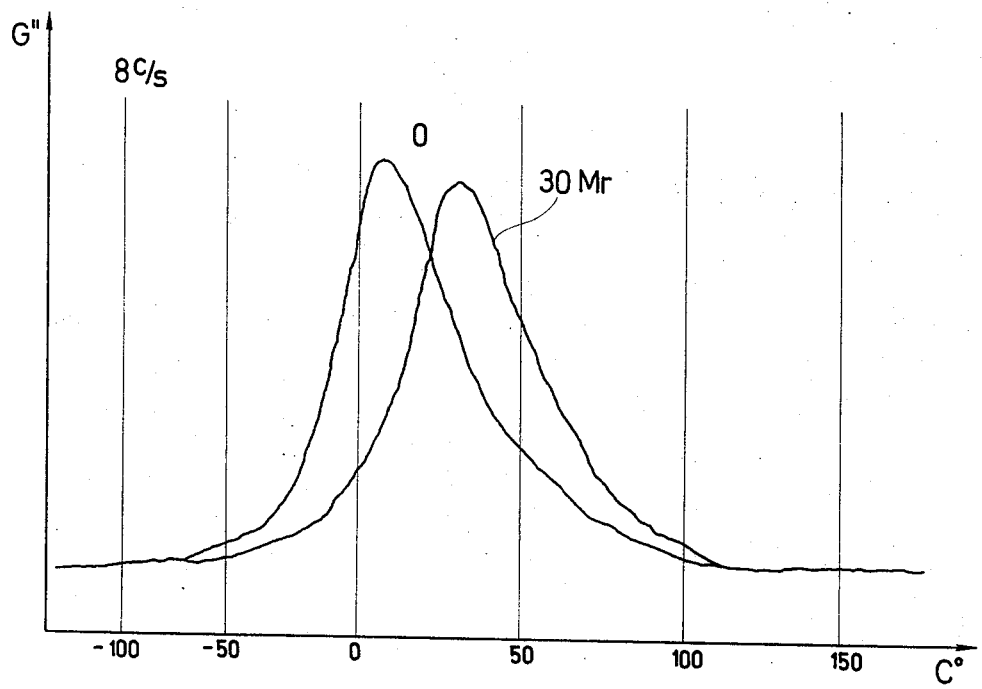
FIG. 7 is a curve showing the mechanical relaxation spectrum of polyethylene subjected to heat treatment and exposed to electron irradiation.

The relatively low crystallinity polyethylene subjected to heat treatment as described above was exposed to 1.8 MeV electron irradiation. The dose was 30 Mrad. As a consequence of the irradiation, the mechanical relaxation peak was shifted toward higher temperatures (FIG. 7). This phenomenon was interpreted as being due to the building up of a cross-linked structure within the polymer.

We claim:

1. A continuously recording mechanical relaxation spectrometer for measuring the temperature dependence of the complex torsional modulus of plastic and rubber systems, comprising a phase-sensitive selsyn-type motor having a pair of coils and a rotatable drive shaft, means for generating two a.c. voltages of different frequencies, means for applying said voltages to said coils to drive said motor and to rotate said drive shaft, means connecting said drive shaft to a specimen under test to apply torsion to said specimen upon rotation of said drive shaft, phase-sensitive output measuring means connected to said motor to provide an output signal that varies with variations in the load placed on said motor by said specimen under test, means for measuring the temperature of said specimen under test, and means for simultaneously recording said temperature and said output signal.

2. A spectrometer as claimed in claim 1, said recording means comprising an X-Y recorder having an X recording axis and a Y recording axis, said temperature-measuring means being connected to operate one axis of said X-Y recorder and said output-measuring means being connected so that said output signal operates the remaining axis of said X-Y recorder.

3. A spectrometer as claimed in claim 1, and heating means to heat said specimen, said heating means including temperature-programming means for varying the temperature of said specimen.

4. A spectrometer as claimed in claim 1, said phase-sensitive output-measuring means including a reference phase-sensitive selsyn-type motor in bridge connection with the first-mentioned motor, said reference motor being connected in reversed phase relation to said first-mentioned motor.

5. A spectrometer as claimed in claim 4, said generating means comprising first-generating means connected to provide an a.c. voltage of a first frequency to said first-mentioned and reference motors and second-generating means connected to provide a second a.c. voltage of a second frequency to said first-mentioned and reference motors, the second generating means being variable to provide different frequencies to said first-mentioned and reference motors.

6. A spectrometer as claimed in claim 5, said output-measuring means comprising a load resistor connected between said first generating means and said bridge-connected first-mentioned and reference motors, and phase-analyzer means connected to said load resistor.

* * * * *